(12) United States Patent
Hamamura et al.

(10) Patent No.: US 7,855,733 B2
(45) Date of Patent: Dec. 21, 2010

(54) ELECTRONIC CAMERA AND RECORDING MEDIUM FOR IMAGES AND IMAGE INFORMATION AND RECORDING IMAGE REPRODUCTION PROGRAM

(75) Inventors: Akihiko Hamamura, Chiba (JP); Ichiro Shidate, Kawasaki (JP)

(73) Assignee: Nikon Corporation, Tokyo (JP)

( * ) Notice: Subject to any disclaimer, the term of this patent is extended or adjusted under 35 U.S.C. 154(b) by 73 days.

(21) Appl. No.: 12/068,642

(22) Filed: Feb. 8, 2008

(65) Prior Publication Data

US 2008/0136927 A1 Jun. 12, 2008

Related U.S. Application Data

(63) Continuation of application No. 11/137,337, filed on May 26, 2005, now abandoned, which is a continuation of application No. 09/502,041, filed on Feb. 11, 2000, now abandoned.

(30) Foreign Application Priority Data

Aug. 17, 1999 (JP) ................................ 11-230595

(51) Int. Cl.
*H04N 5/225* (2006.01)
(52) U.S. Cl. ............. 348/220.1; 348/231.7; 348/333.01
(58) Field of Classification Search ............. 348/220.1, 348/231.7, 333.01, 333.05, 333.12
See application file for complete search history.

(56) References Cited

U.S. PATENT DOCUMENTS 6,097,431 A * 8/2000 Anderson et al. ........ 348/231.7
6,233,015 B1 5/2001 Miller et al.
6,292,217 B1 9/2001 Uehara et al.
6,359,649 B1 * 3/2002 Suzuki .................... 348/220.1
6,445,412 B1 9/2002 Shiohara
6,618,082 B1 9/2003 Hayashi et al.
6,686,965 B1 2/2004 Fujii
6,774,946 B1 * 8/2004 Misawa et al. .............. 348/372

FOREIGN PATENT DOCUMENTS

| JP | A-7-298196 | 10/1995 |
|---|---|---|
| JP | A-8-275034 | 10/1996 |
| JP | A-8-289180 | 11/1996 |
| JP | A-10-63688 | 3/1998 |
| JP | A-10-241230 | 9/1998 |
| JP | A-10-257466 | 9/1998 |

OTHER PUBLICATIONS

Sep. 9, 2008 Office Action issued in Japanese Patent Application No. 11-230595 (with translation).
Dec. 9, 2008 Office Action issued in Japanese Patent Application No. 11-230595 (with translation).

* cited by examiner

*Primary Examiner*—Gevell Selby
(74) *Attorney, Agent, or Firm*—Oliff & Berridge, PLC

(57) ABSTRACT

An electronic camera that generates a still image by photographing a subject, generates image information related to the still image having a data volume smaller than a data volume of the still image and records the still image and the image information, includes: a frame feed reproduction device that sequentially reproduces a plurality of still images recorded in advance; a high-speed frame feed reproduction device that sequentially displays a plurality of sets of image information recorded in advance; and a switching device that selects either the frame feed reproduction device or the high-speed frame feed reproduction device to switch between the frame feed reproduction device and the high-speed frame feed reproduction device.

19 Claims, 5 Drawing Sheets

FRAME FEED REPRODUCTION

HIGH SPEED FRAME FEED REPRODUCTION

ELECTRONIC CAMERA AND RECORDING MEDIUM FOR IMAGES AND IMAGE INFORMATION AND RECORDING IMAGE REPRODUCTION PROGRAM

This is a Continuation of application Ser. No. 11/137,337 filed May 25, 2005, which is a Continuation of application Ser. No. 09/502,041 filed Feb. 11, 2000. The entire disclosure of each prior application is hereby incorporated by reference herein in its entirety.

INCORPORATION BY REFERENCE

The disclosure of the following priority application is herein incorporated by reference:

Japanese Patent Application No. 11-230595, filed Aug. 17, 1999

BACKGROUND OF THE INVENTION

1. Field of the Invention

The present invention relates to an electronic camera that reproduces a prerecorded still image and a recording medium that records an image reproduction program for executing still image reproduction on a computer.

2. Description of the Related Art

In an electronic camera provided with a liquid crystal monitor in the prior art, processing during which image data corresponding to a plurality of prerecorded still images are read out from a recording medium and are sequentially displayed on the liquid crystal monitor each time a specific operating button is pressed (hereafter referred to as "frame feed reproduction") is realized. Namely, in such an electronic camera, when the specific operating button is pressed while a still image is on display, the still image displayed on the liquid crystal monitor is updated.

For instance, through this frame feed reproduction, the operator is enabled to search for a desired still image by checking a plurality of still images one at a time.

It is desirable in such frame feed reproduction that the time elapsing after the specific operating button is pressed until the still image display is updated (hereafter referred to as "image updating time") be as short as possible.

However, it is difficult to reduce the image updating time since it is determined in conformance to the volume of data read out from the recording medium and the read is speed. In particular, in an electronic camera having a large number of pixels at its image-capturing element and, as a result, handling a large volume of image data, a long time is required for the image data read, which results in the image updating time extending up to several seconds.

Thus, even when the operator holds down the specific operating button continuously or presses it repeatedly over short intervals, the still image displayed on the liquid crystal monitor is not updated instantly, which makes it difficult for the operator to search for a desired still image quickly.

SUMMARY OF THE INVENTION

An object of the present invention is to provide an electronic camera capable of reproducing a desired still image quickly.

Another object of the present invention is to provide a recording medium that records an image reproduction program for executing quick reproduction of a desired still image on a computer.

In order to attain the above objet, an electronic camera according to the present invention that generates a still image by photographing a subject, generates image information related to the still image having a data volume smaller than a data volume of the still image and records the still image and the image information, comprises: a frame feed reproduction device that sequentially reproduces a plurality of still images recorded in advance; a high-speed frame feed reproduction device that sequentially displays a plurality of sets of image information recorded in advance; and a switching device that selects either the frame feed reproduction device or the high-speed frame feed reproduction device to switch between the frame feed reproduction device and the high-speed frame feed reproduction device.

In this electronic camera, a desired still image can be reproduced without having to reproduce other still images unnecessarily.

In this electronic camera, it is preferred that: the frame feed reproduction device reproduces a still image each time an individual external operation is received when external operations are received at a specific operating unit over intervals exceeding a specific length of time; and the switching device switches to the high-speed frame feed reproduction device if a continuous external operation is received or repeated external operations are received over intervals shorter than the specific length of time at the operating unit while the frame feed reproduction device is selected. In this case, it is preferred that the switching device switches to the frame feed reproduction device when external operations are no longer received or external operations are received over intervals longer than the specific length of time at the operating unit while the high-speed frame feed reproduction device is selected.

In this electronic camera, assuming that a specific length of time represents the length of time required for reproduction of a single still image, an interval that exceeds the specific length of time is equivalent to the interval over which continuous reproduction of a plurality of still images is possible. Thus, if an external operation is performed repeatedly over intervals equal to or shorter than the specific length of time (an interval over which continuous reproduction of still images is not possible), it is highly likely that the external operation has been performed by the operator so as to avoid unnecessary reproduction of still images (in order to shift to search processing to find a desired still image).

Since the high speed frame feed reproduction device is selected over the frame feed reproduction device in such a situation in the electronic camera described above, processing that enables the operator to search for a desired still image while avoiding unnecessary reproduction of still images can be implemented in a manner that accurately reflects the operator's intention. In addition, an operating unit that receives "an external operation to provide an instruction with respect to the timing of still image reproduction by the frame feed reproduction device" can be utilized as an operating unit that accepts "an external operation to provide an instruction with respect to the timing of switching to be effected by the switching device." Thus, it is not necessary to provide another separate operating unit for receiving the "external operation to provide an instruction with respect to the timing of switching to be effected by the switching device."

In addition, the external operation to provide an instruction for switching from the high-speed frame feed reproduction device to the frame feed reproduction device is received with a high degree of reliability. Thus Still image reproduction can be implemented in response to instructions issued by the operator.

Also, in the above electronic camera, it is preferred that when the switching device performs a switching operation, the frame feed reproduction device reproduces a still image corresponding to contents of display implemented by the high-speed frame feed reproduction device immediately before the switching operation.

In this case, a desired still image can be reproduced if the frame feed reproduction device is selected at a point in time at which display of the desired still image has been achieved by the high speed frame feed reproduction device. Thus, the desired still image can be reproduced without having to unnecessarily reproduce other still images.

An electronic camera according to the present invention that generates a still image by photographing a subject and records the still image, comprises: a frame feed reproduction device that sequentially reproduces a plurality of still images recorded in advance; a high-speed frame feed reproduction device that sequentially displays frame numbers each assigned to one of the plurality of still images; and a switching device that selects either the frame feed reproduction device or the high-speed frame feed reproduction device to switch between the frame feed reproduction device and the high-speed frame feed reproduction device.

Since the switching device switches between the frame feed reproduction device and the high-speed frame feed reproduction device in this electronic camera, either still image reproduction or frame number display can be implemented for a single frame when still image display by the frame feed reproduction device is performed in the order of frame numbers. In other words, it is possible to specify frames for frame number display (no still image reproduction) and frames for sill image reproduction by controlling the timing of the switching effected by the switching device. As a result, the desired still image can be reproduced without having to unnecessarily reproduce other still images.

An electronic camera according to the present invention that generates a still image by photographing a subject and records, at least, the still image and photographic information corresponding to the still image, comprises: a frame feed reproduction device that sequentially reproduces a plurality of still images recorded in advance; a high-speed frame feed reproduction device that sequentially displays a plurality of sets of photographic information recorded in advance; and a switching device that selects either the frame feed reproduction device or the high-speed frame feed reproduction device to switch between the frame feed reproduction device and the high-speed frame feed reproduction device.

Since the switching device switches between the frame feed reproduction device and the high speed frame feed reproduction device in this electronic camera, either still image reproduction or photographic information display can be implemented for a single frame when still image reproduction by the frame feed reproduction device and photographic information display by the high speed frame feed reproduction device are both performed in the order of frame numbers.

The operator can search for a desired frame based upon the photographic information corresponding to the individual frames. Namely, the electronic camera described above can be switched to a state in which a desired still image can be searched with the photographic information on display (a state in which still image reproduction is not in progress) or a state in which still image reproduction is performed. As a result, a desired still image can be reproduced without having to unnecessarily reproduce other still images.

An electronic camera according to the present invention that generates a still image by photographing a subject and records, at least, the still image and a reduced image for thumbnail display corresponding to the still image, comprises: a frame feed reproduction device that sequentially reproduces a plurality of still images recorded in advance; a high-speed frame feed reproduction device that sequentially displays a plurality of reduced images recorded in advance; and a switching device that selects either the frame feed reproduction device or the high-speed frame feed reproduction device to switch between the frame feed reproduction device and the high-speed frame feed reproduction device.

Since the switching device switches between the frame feed reproduction device and the high speed frame feed reproduction device in this electronic camera, either still image reproduction or reduced image display can be implemented for a single frame when still image reproduction by the frame feed reproduction device and reduced image display by the high speed frame feed reproduction device are both performed in the order of frame numbers.

In other words, the electronic camera can be switched to a state in which a desired still image can be searched with reduced image display in progress (a state in which still image reproduction is not in progress) or a state in which still image reproduction is performed. Thus, a desired still image can be reproduced without having to unnecessarily reproduce other still images.

In the above electronic camera, it is preferred that the high-speed frame feed reproduction device displays a reduced image superimposed on a still image that has been reproduced by the frame feed reproduction device before a switching operation is performed by the switching device.

In this case, the operator is enabled to compare the individual images by viewing the image achieved by superimposing the reduced image on the still image reproduced by the frame feed reproduction device prior to the switching operation.

As a result, the desired still image can be reproduced without having to unnecessarily reproduce other still images and furthermore, the trouble the operator must go through to search for a desired still image is lessened.

An image reproduction apparatus according to the present invention that reads out data from a recording device that records a still image and image information related to the still image having a data volume smaller than a data volume of the still image and reproduces the still image, comprises: a frame feed reproduction device that sequentially reproduces a plurality of still images recorded in advance; a high-speed frame feed reproduction device that sequentially displays a plurality of sets of image information recorded in advance; and a switching device that selects either the frame feed reproduction device or the high-speed frame feed reproduction device to switch between the frame feed reproduction device and the high-speed frame feed reproduction device.

A recording medium according to the present invention has an image reproduction program for reproducing a still image by reading out data from a recording device that records a still image and image information related to the still image having a data volume smaller than a data volume of the still image, recorded therein. The image reproduction program comprises: a frame feed reproduction instruction for sequentially reproducing a plurality of still images recorded in advance; a high-speed frame feed reproduction instruction for sequentially displaying a plurality of sets of image information recorded in advance; and a switching instruction for switching between the frame feed reproduction instruction and the high-speed frame feed reproduction instruction by selecting either the frame feed reproduction instruction or the high-speed frame feed reproduction instruction.

A data signal according to the present invention embodied in a carrier wave comprises an image reproduction program for displaying a still image by reading out data from a recording device that records the still image and image information related to the still image having a data volume smaller than the data volume of the still image. The image reproduction program comprises: a frame feed reproduction instruction for sequentially reproducing a plurality of still images recorded in advance; a high-speed frame feed reproduction instruction for sequentially displaying a plurality of sets of image information recorded in advance; and a switching instruction for switching between the frame feed reproduction instruction and the high-speed frame feed reproduction instruction by selecting either the frame feed reproduction instruction or the high-speed frame feed reproduction instruction.

DESCRIPTION OF THE PREFERRED EMBODIMENT

The following is an explanation of an embodiment of the present invention, given in reference to the drawings.

Figure 1:
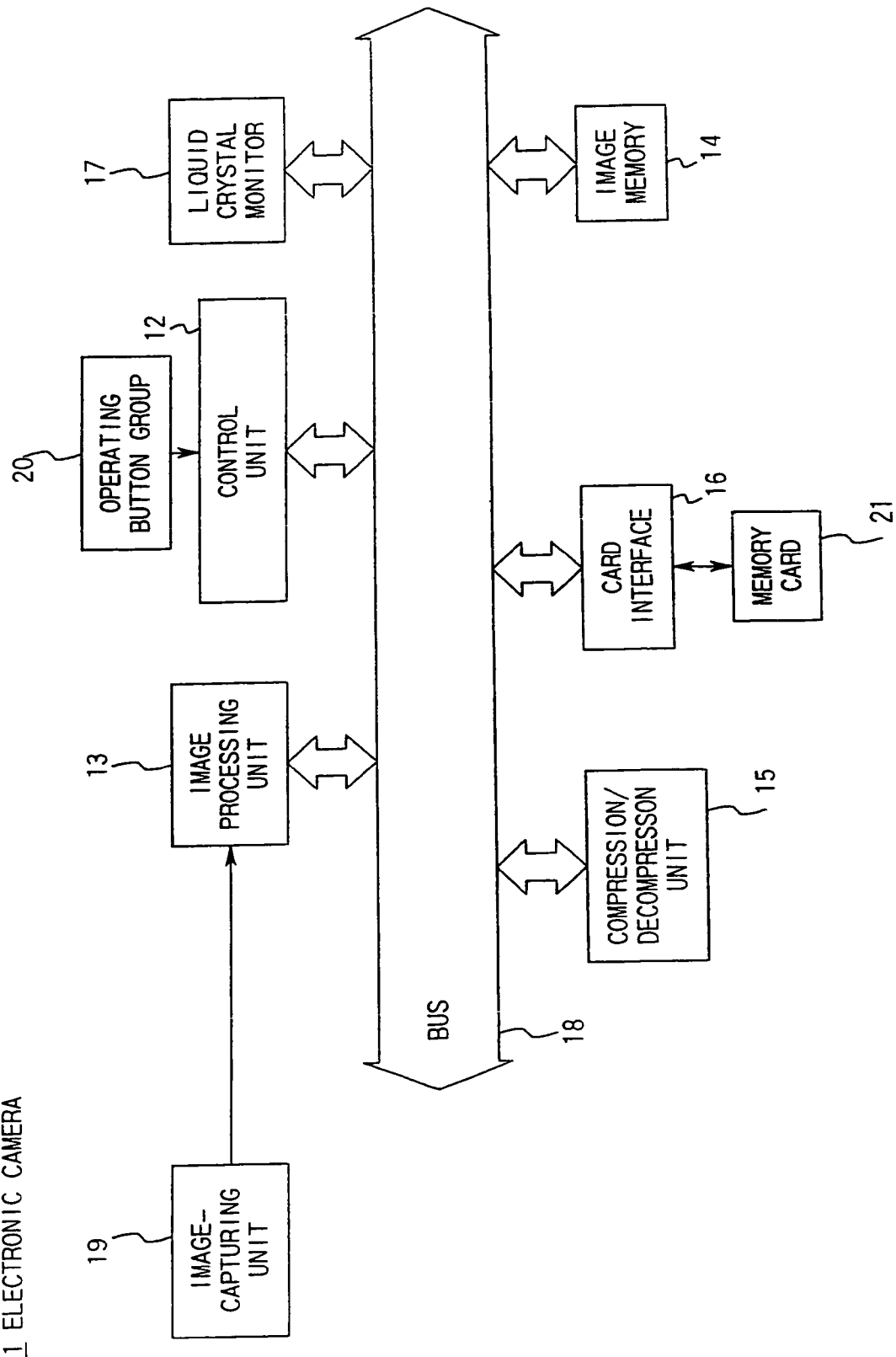
FIG. 1 is a block diagram illustrating the structure of an electronic camera.
Figure 2:
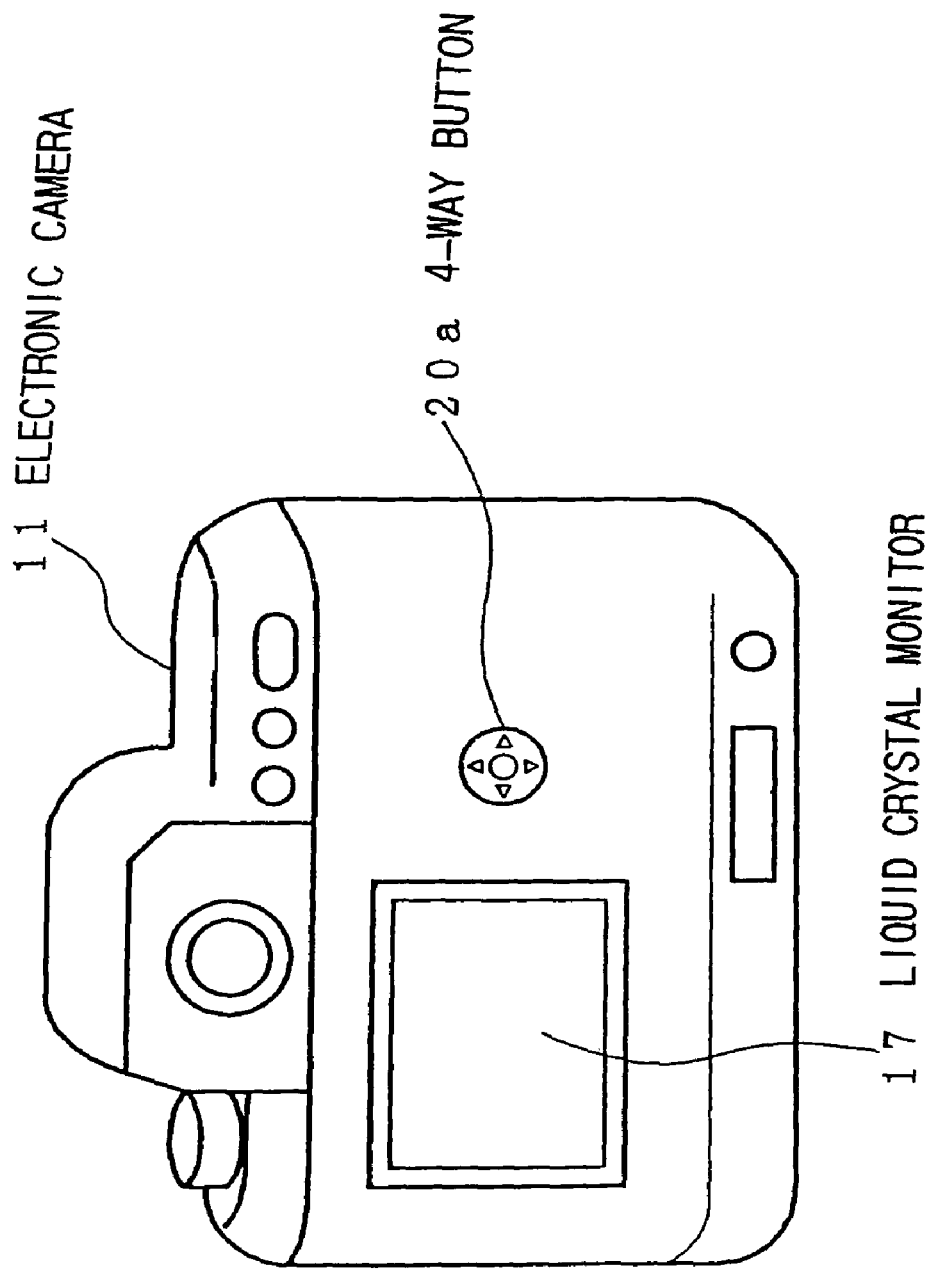
FIG. 2 is an external view of the electronic camera.

FIG. 1 is a block diagram illustrating the structure of an electronic camera and FIG. 2 is an external view of the electronic camera.

In FIG. 1, in an electronic camera 11, a control unit 12, an image processing unit 13, an image memory 14, a compression/decompression unit 15, a card interface 16 and a liquid crystal monitor 17 are connected with one another via a bus 18. In addition, the electronic camera 11 is provided with an image-capturing unit 19 and an operating button group (corresponds to a plurality of operating buttons such as a 4-way button 20a in FIG. 2 provided at the casing of the electronic camera 11) 20 with the image-capturing unit 19 connected to the image processing unit 13 and the operating button group 20 connected to the control unit 12. A memory card 21 is loaded in the electronic camera 11, and the memory card 21 is connected to the card interface 16.

The present invention is characterized by the still image reproduction processing performed in a state in which a plurality of still images are recorded in advance. Thus, it is assumed that a plurality of image files created in a specific file format are pre-recorded in the memory card 21 in this embodiment, and an explanation of the process through which the image files are created and recorded in the memory card 21 is omitted.

It is to be noted that image files handled in the embodiment, which are coded through JPEG or the like, include photographic information and image data of reduced images for thumbnail display in addition to image data of still images. The photographic information and the reduced image data constitute image information related to the still images and account for a data volume that is extremely small compared to the data volume of the still images themselves. The following is examples of the photographic information.

file name photographing date exposure information (e.g. F8, 1/100 sec etc.)

lens information (lens name, focal length)

white balance (fluorescent lamp, daylight, fair weather, cloudy weather, date)

longitudinal photographing/lateral photographing photometering method (central weighted photometering, multi-pattern photometering, spot photometering)

exposure correction (e.g. +1/3, +2/3, −1/3, −2/3)

exposure mode (program exposure, aperture priority exposure, shutter priority exposure, manual exposure)

Figure 3:
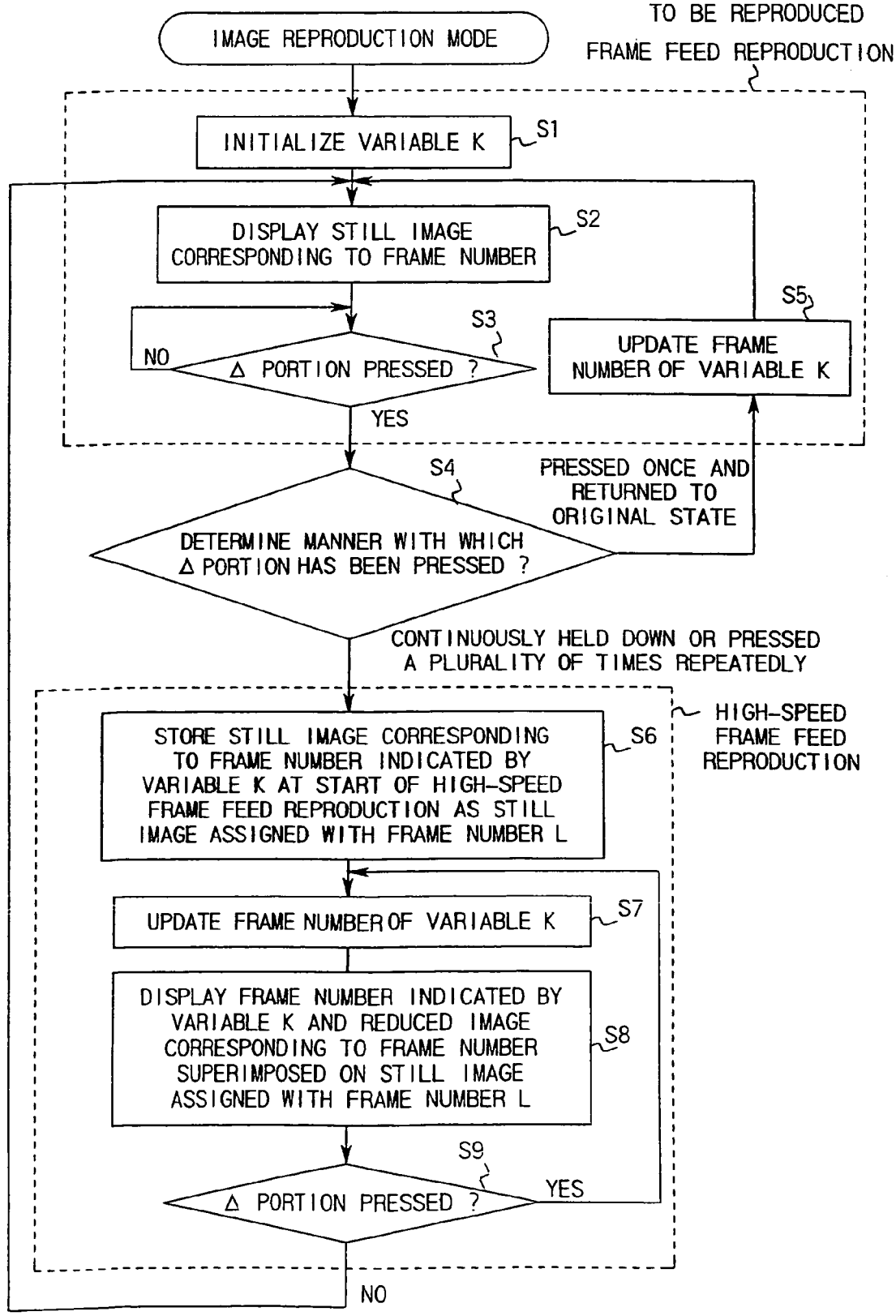
FIG. 3 is a flowchart of the operation achieved in an embodiment.

FIG. 3 is a flowchart of the operation achieved in the embodiment, and more specifically, it illustrates the operation performed by the control unit 12 in a state in which a mode for implementing still image reproduction (hereafter referred to as an "image reproduction mode") is set.

It is to be noted that although not mentioned in FIG. 3, the control unit 12 constantly monitors whether or not any external operation has been performed through any of the operating buttons and the contents of such an external operation (hereafter referred to as "external operation monitoring") based upon electrical signals (electrical signals indicating the states of the contact points at the individual operating buttons) provided by the operating button group 20.

In addition, although not mentioned in FIG. 3, the control unit 12 counts the number of image files recorded in the memory card 21 in advance and assigns frame numbers to the individual image files in a specific order (e.g. in the chronological order in which they were created).

The following is an explanation of the operation achieved in the embodiment given in reference to the figure.

First, the control unit 12 initializes the variable K that indicates the frame number of the image file to be reproduced (FIG. 3 S1).

It is to be noted that in the embodiment, the initial value of the variable K is the smallest frame number (frame number 1) with the frame number indicated by the variable K updated in the ascending order.

Next, the control unit 12 displays the still image corresponding to the frame number indicated by the variable K on the liquid crystal monitor 17 (FIG. 3 S2). Namely, the control unit 12 issues an instruction to the card interface 16 to read out the image data of the still image corresponding to the frame number indicated by the variable K from the memory card 21, and also issues an instruction to the compression/decompression unit 15 to decompress the image data and an instruction to the liquid crystal monitor 17 to display the decompressed image data.

Figure 4:
FIGS. 4A and 4B present examples of liquid crystal monitor display.
Figure 4:
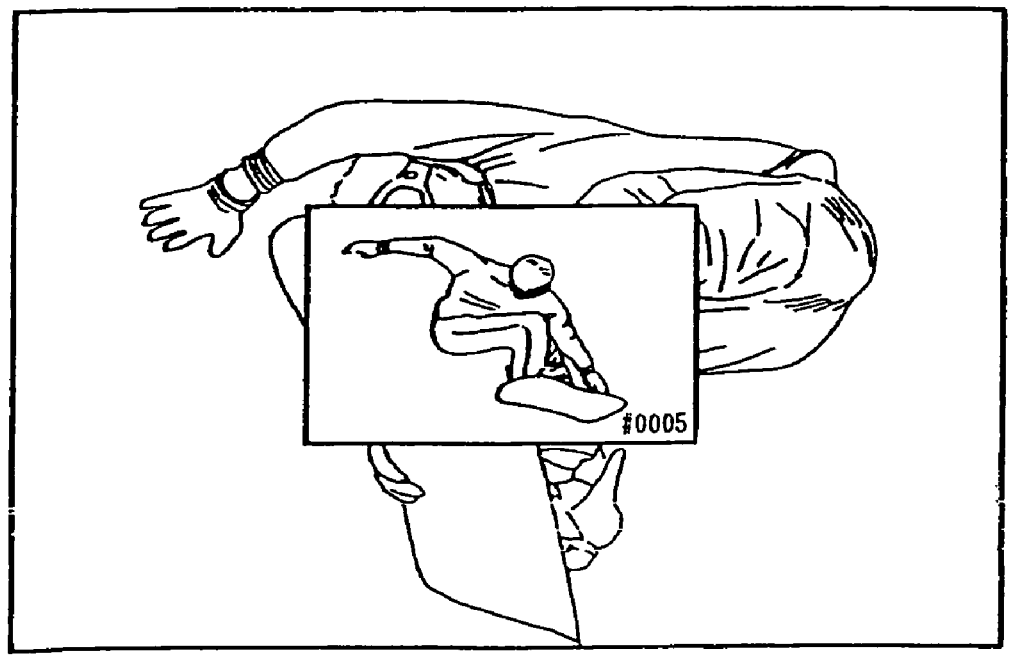

It is to be noted that through this processing, a still image such as that in FIG. 4A, for instance, is displayed on the liquid crystal monitor 17.

Next, the control unit 12 makes a decision as to whether or not the Δ portion of the 4-way button (cross button) 20a has been pressed through the external operation monitoring explained earlier (FIG. 3 S3). It is to be noted that the control unit 12 repeatedly performs the same decision-making (FIG. 3 S3) until it is verified that the Δ portion of the 4-way button 20a has been pressed.

If the Δ portion of the 4-way button 20a has been pressed, the control unit 12 makes a decision as to how the Δ portion of the 4-way button 20a has been pressed before a specific length of time (e.g. 1 sec) elapses following the time point at which it is confirmed that the Δ portion has been pressed (FIG. 3 S4).

Then, if the Δ portion of the 4-way button 20a has been pressed once and then returned to the original state, the control unit 12 updates the frame number indicated by the variable K (FIG. 3 S5), and displays the still image corresponding to the frame number indicated by the variable K on the liquid crystal monitor 17 (FIG. 3 S2). Namely, in the embodiment, frame feed reproduction is realized by repeating the processing in S2 and S5 in FIG. 3.

If the Δ portion of the 4-way button 20a has been held down continuously or the Δ portion of the 4-way button 20a has been pressed a plurality of times repeatedly, the control unit 12 implements high-speed frame feed reproduction (corresponds to the processing in FIG. 3 S6~S9) described below.

First, the control unit 12 stores the still image corresponding to the frame number indicated by the variable K at the start of the high-speed frame feed reproduction in the image memory 14 as a still image with a frame number L (FIG. 3 S6) and then updates the frame number of the variable K (FIG. 3 S7).

Next, the control unit 12 displays the frame number indicated by the variable K and a reduced image corresponding to the frame number, by superimposing them on the still image corresponding to the frame number L (FIG. 3 S8). In other words, the control unit 12 issues an instruction to the card interface 16 to read out the image data of the reduced image corresponding to the frame number indicated by the variable K from the memory card 21. In addition, the control unit 12 overlays the image data of the reduced image and the image data corresponding to the frame number over a specific area in the image data of the still image assigned with the frame number L, and issues an instruction to the liquid crystal monitor 17 to display the image data obtained through the overlay.

It is to be noted that through this processing, the image displayed on the liquid crystal monitor 17 is updated from that in FIG. 4A to that in FIG. 4B. While the reduced image is displayed at the center of the screen and a new reduced image is superimposed and displayed with every update in FIG. 4B, reduced images may be displayed side by side sequentially over the still image, instead.

In the embodiment, the high-speed frame reproduction is achieved by repeatedly executing the processing in FIG. 3 S7 and the processing in FIG. 3 S8, and it is assumed that steps S7 and S8 are repeated only when the Δ portion of the 4-way button 20a is held down continuously or is pressed down repeatedly.

In other words, at the time point at which the processing in FIG. 3 S8 is completed, the control unit 12 makes a decision as to whether or not the Δ portion of the 4-way button 20a is being held down continuously (FIG. 3 S9), updates the frame number indicated by the variable K if the Δ portion of the 4-way button 20a is being held down continuously (FIG. 3 S7) and displays the frame number indicated by the variable K and the reduced image corresponding to the frame number on the liquid crystal monitor 17 by superimposing them on the still image assigned with the frame number L (FIG. 3 S8).

If, on the other hand, the Δ portion of the 4-way button 20a is not being pressed, the control unit 12 displays a still image corresponding to the frame number indicated by the variable K (the frame number currently displayed on the liquid crystal monitor 17) on the liquid crystal monitor 17 (FIG. 3 S2).

As explained above since the frame number indicated by the variable K, the reduced image corresponding to the frame number and the still image assigned with the frame number L can be displayed on the liquid crystal monitor 17 during the high-speed frame feed reproduction in the embodiment, the operator is enabled to search for a desired still image even though the still image corresponding to the frame number indicated by the variable K is not on display. In particular since the reduced image corresponding to the frame number indicated by the variable K and the still image assigned with the frame number L are displayed at the same time in the embodiment, the operator can compare them, to achieve a faster search of a desired still image compared to the search performed with only the reduced image on display.

In addition since the data volume of a reduced image is extremely small compared to the data volume of a still image, the image display at the liquid crystal monitor 17 can be updated more quickly in the high-speed frame feed reproduction compared to the display updated in the frame feed reproduction in the embodiment.

Furthermore since the variable K is utilized commonly in the frame feed reproduction and the high-speed frame feed reproduction in the embodiment, the still image corresponding to the frame number indicated by the variable K, which has been updated during a high-speed frame feed reproduction can be displayed on the liquid crystal monitor 17 when the operation is switched from the high-speed frame feed reproduction to the frame feed reproduction.

As a result, if the operator performs the operations (1)~(3) below while a frame feed reproduction is in progress, a desired still image can be displayed on the liquid crystal monitor 17 more quickly in the embodiment compared to a still image display achieved in a camera capable of frame feed reproduction only.

(1) The operator requests high-speed frame feed reproduction by operating the Δ portion of the 4-way is button 20a.

(2) The operator searches for a desired still image based upon the frame number, the reduced image and the still image assigned with the frame number L displayed on the liquid crystal monitor 17 while pressing down the Δ portion of the 4-way button 20a.

(3) The operator stops pressing the Δ portion of the 4-way button 20a when the frame number and the reduced image of the desired still image are displayed on the liquid crystal monitor 17.

The processing executed by the control unit 12 may be recorded in the form of an image reproduction program in a recording medium such as a CD ROM. Thus, by executing the image reproduction program recorded in the recording medium on a computer, images can be displayed at a display device connected to the computer as with the liquid crystal monitor 17 of the electronic camera. However, the function of the Δ portions of the 4-way button 20a will be achieved by the cursor keys or the like of the keyboard connected to the computer, instead.

Figure 5:
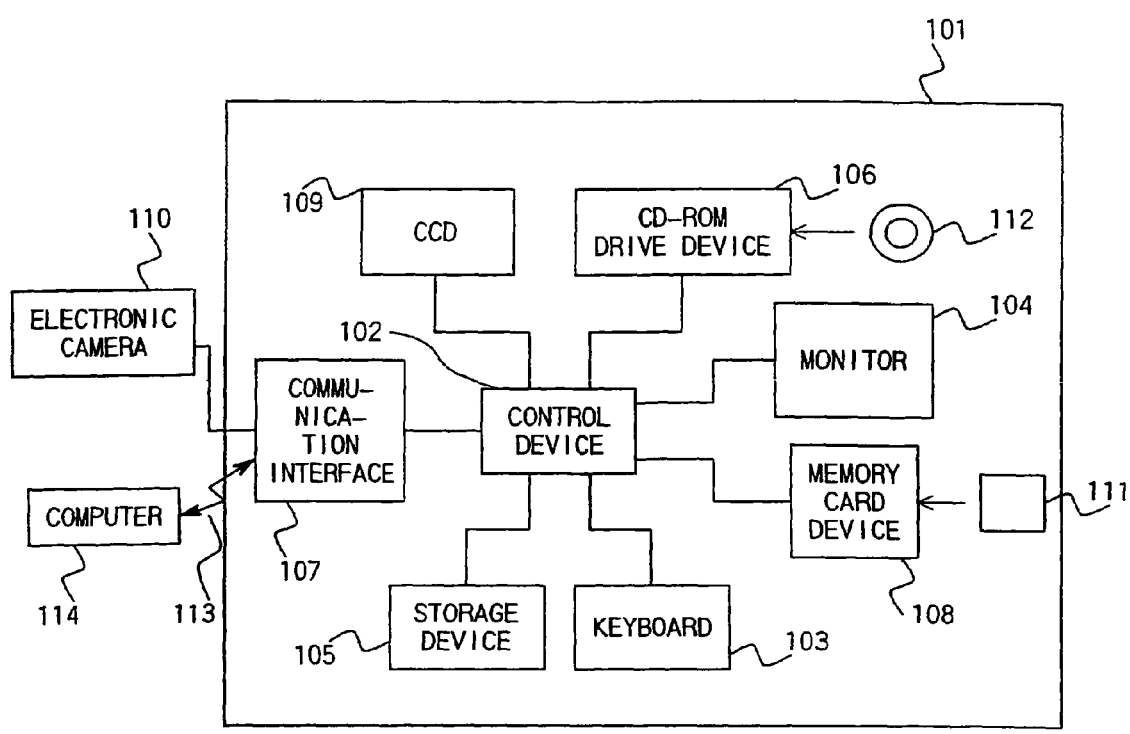
FIG. 5 is a block diagram of a personal computer that executes the image reproduction program.

FIG. 5 is a block diagram of a personal computer 101 that executes the image reproduction program described above. In the personal computer 101, a control device 102 that executes various programs, a keyboard 103, a monitor 104, a storage device 105 such as a hard disk, a CD ROM drive device 106, a communication interface 107, a memory card device 108 and the like are connected.

In addition, the personal computer 101 is provided with a CCD camera 109 and, as a result, is capable of capturing an image of a subject as is an electronic camera and storing still image data and related image information in the storage device 105. Alternatively, the personal computer 101 may be connected with an electronic camera 110 via the communication interface 107 to store image data generated through image-capturing performed by the electronic camera 110 (including still image data and image information related to still images) in the storage device 105. As a further alternative, image data generated through image-capturing performed by the electronic camera 110 may be recorded in a memory card 111, and the image data may be read by loading the memory card 111 into the memory card device 108. By executing the image reproduction program described above, the control device 102 reproduces still images on the monitor 104 based upon the data recorded in a recording device such as the storage device 105 of the memory card 111.

The image reproduction program, which can be executed on a personal computer, is recorded and provided in a CD ROM 112. The CD ROM 112, which is loaded in the CD ROM drive device 106, is read by the control device 102. It is to be noted that the recording medium, in which the image reproduction program is recorded, does not need to be a CD ROM. Any of other various types of recording media including magnetic tape and DVD may be used, instead. In addition, the image reproduction program may be provided via a transmission medium such as a communication line, a typical example of which is the Internet. In other words, the program may be converted to and transmitted as a signal on a carrier wave that transmits through a transmission medium.

The communication interface 107 may be connected to a communication line 113. A computer 114 is a server computer in which the image reproduction program is stored so that is can be provided by the computer 114. The communication line 113 may be a telephone line for the Internet or a personal computer communication line or it may be a dedicated communication line.

It is to be noted that while the frame number indicated by the variable K and the reduced image corresponding to the frame number are superimposed on the still image assigned with the frame number L for display during high-speed frame feed reproduction in the embodiment, only the frame number or the reduced image may be displayed instead. Alternatively, the photographic information (may be partial) corresponding to the frame is number indicated by the variable K may be displayed.

In addition, while a decision is made as to whether or not the Δ portion of the 4-way button 20a has been pressed (corresponds to FIG. 3 S3) after the still image corresponding to the frame number indicated by the variable K is displayed in the embodiment, such decision-making may be performed while the processing related to still image display is in progress (while still image update has not yet been completed). However, if the Δ portion of the 4-way button 20a is pressed in such a state, the control unit 12 must perform high-speed frame feed reproduction regardless of the manner with which the Δ portion of the 4-way button 20a is pressed (held down over a specific length of time or longer, or pressed a plurality of times repeatedly within a specific period of time).

Moreover, while an instruction to switch from frame feed reproduction to high-speed frame feed reproduction is issued by holding down the Δ portion of the 4-way button 20a continuously or pressing it a plurality of times repeatedly and an instruction to switch from high-speed frame feed reproduction to frame feed reproduction is issued when the Δ portion of the 4-way button 20a is not pressed, these switches may be effected through any manner of pressing the 4-way button 20a or by using another is operating button.

While the frame number corresponding to the image to be reproduced is updated in ascending order each time the Δ portion of the 4-way button 20a is pressed, the frame number may be updated in descending order instead by, for instance, pressing the ∇ portion of the 4-way button 20a.

In addition, while the image achieved by superimposing the frame number indicated by the variable K and the reduced image corresponding to the frame number on the still image assigned with a frame number L or the still image corresponding to the frame number indicated by the variable K is displayed on the liquid crystal monitor 17 provided at the electronic camera 11 in the embodiment, these images may be displayed on an external display device instead.

It is to be noted that in the electronic camera in the embodiment, the image reproduction program according to the present invention executed in the electronic camera is normally installed in a ROM or the like during the manufacturing process. However, the program may be installed in a ROM that allows an overwrite so that an upgrade program can be provided from a recording medium such as a CD ROM via the personal computer 101 through connection to the personal computer 101 by adopting a structure similar to that illustrated in FIG. 5. Furthermore, an upgrade program may be provided via the Internet or the like as described above.

What is claimed is:

1. An electronic camera that generates a still image by photographing a subject, generates image information corresponding to the still image having a data volume smaller than a data volume of the still image and records the still image and the image information into a recording medium, comprising:

a frame feed reproduction device that sequentially switches a display of a still image recorded in the recording medium in advance;

a high-speed frame feed reproduction device that sequentially displays a set of image information corresponding to a still image recorded in the recording medium in advance; and a switching device that selects either said frame feed reproduction device or said high-speed frame feed reproduction device to switch between said frame feed reproduction device and said high-speed frame feed reproduction device, wherein said frame feed reproduction device displays a still image each time an individual external frame feed operation is received when the external frame feed operation are received at a specific operating unit over intervals exceeding a specific length of time;

said switching device switches to said high-speed frame feed reproduction device if the external frame feed operation is continuously received or the external frame feed operations are repeatedly received over intervals shorter than the specific length of time at said operating unit while said frame feed reproduction device is selected; and when said switching device has performed a first switching operation to switch to said high-speed frame feed reproduction device from said frame feed reproduction device, said high-speed frame feed reproduction device sequentially displays a set of image information corresponding to a still image recorded in the recording medium in advance while continuing to display at least a part of a still image displayed by said frame feed reproduction device immediately before the first switching operation.

2. An electronic camera according to claim 1, wherein:

said switching device switches to said frame feed reproduction device when external operations are no longer received or external operations are received over intervals longer than the specific length of time at said operating unit while said high-speed frame feed reproduction device is selected.

3. An electronic camera according to claim 2, wherein:
when said switching device performs a switching operation to switch to said frame feed reproduction device from said high-speed frame feed reproduction device, said frame feed reproduction device displays a still image corresponding to contents of display implemented by said high-speed frame feed reproduction device immediately before the switching operation.

4. An electronic camera according to claim 1, wherein:
when said switching device performs a second switching operation to switch to said frame feed reproduction device from said high-speed frame feed reproduction device, said frame feed reproduction device displays a still image corresponding to contents of display implemented by said high-speed frame feed reproduction device immediately before the second switching operation.

5. An electronic camera according to claim 1, wherein:
when said switching device has performed the first switching operation to switch to said high-speed frame feed reproduction device from said frame feed reproduction device, said frame feed reproduction device stops switching a display of a still image and said high-speed frame feed reproduction device displays a set of image information; and
when said switching device performs a second switching operation to switch to said frame feed reproduction device from said high-speed frame feed reproduction device, said frame feed reproduction device displays a still image corresponding to contents of display implemented by said high-speed frame feed reproduction device immediately before the second switching operation.

6. An electronic camera according to claim 1, wherein:
a still image is recorded in the recording medium in a specific file format.

7. An electronic camera according to claim 1, wherein:
a still image is recorded in the recording medium after being compressed.

8. An electronic camera according to claim 1, wherein:
a still image is recorded in the recording medium that is a memory card.

9. An electronic camera that generates a still image by photographing a subject and records the still image into a recording medium, comprising:
a frame feed reproduction device that sequentially switches a display of a still image recorded in the recording medium in advance;
a high-speed frame feed reproduction device that sequentially displays a frame number without switching a display of a still image, wherein the frame number is displayed superimposed over the still image; and
a switching device that selects either said frame feed reproduction device or said high-speed frame feed reproduction device to switch between said frame feed reproduction device and said high-speed frame feed reproduction device, wherein
said frame feed reproduction device displays a still image each time an individual external frame feed operation is received when the external frame feed operation are received at a specific operating unit over intervals exceeding a specific length of time; and
said switching device switches to said high-speed frame feed reproduction device if the external frame feed operation is continuously received or the external frame feed operations are repeatedly received over intervals shorter than the specific length of time at said operating unit while said frame feed reproduction device is selected.

10. An electronic camera according to claim 9, wherein:
when said switching device has performed a switching operation to switch to said high-speed frame feed reproduction device from said frame feed reproduction device, said high-speed frame feed reproduction device displays the frame number while keeping displaying of a still image displayed by said frame feed reproduction device immediately before the switching operation.

11. An electronic camera that generates a still image by photographing a subject and records, at least, the still image and photographic information corresponding to the still image, comprising:
a frame feed reproduction device that sequentially switches a display of a still image each time a first operation is received;
a high-speed frame feed reproduction device that sequentially displays a set of photographic information corresponding to a still image at a fixed position while a second operation is being continuously received, wherein the photographic information is superimposed over the still image; and
a switching device that selects either said frame feed reproduction device or said high-speed frame feed reproduction device to switch between said frame feed reproduction device and said high-speed frame feed reproduction device, wherein
said frame feed reproduction device displays a still image each time an individual external frame feed operation is received when the external frame feed operation are received at a specific operating unit over intervals exceeding a specific length of time; and
said switching device switches to said high-speed frame feed reproduction device if the external frame feed operation is continuously received or the external frame feed operations are repeatedly received over intervals shorter than the specific length of time at said operating unit while said frame feed reproduction device is selected.

12. An electronic camera according to claim 11, wherein:
when said switching device has performed a switching operation to switch to said high-speed frame feed reproduction device from said frame feed reproduction device, said high-speed frame feed reproduction device displays a set of photographic information while keeping displaying of a still image displayed by said frame feed reproduction device immediately before the switching operation.

13. An electronic camera according to claim 11, wherein:
the first operation is that a button is once pressed and released within a specific length of time, and the second operation is that the button is pressed and held down within the specific length of time or the button is pressed and released a plurality of times within the specific length of time.

14. An electronic camera according to claim 13, wherein:
the switching device switches to said high-speed frame feed reproduction device when the second operation has been detected.

15. An electronic camera that generates a still image by photographing a subject, generates a reduced image for thumbnail display corresponding to the still image, and records the still image and the reduced image for thumbnail display corresponding to the still image, comprising:
- a frame feed reproduction device that sequentially switches a display of a still image with a predetermined display size each time a first operation is received;
- a high-speed frame feed reproduction device that sequentially switches a display of a reduced image corresponding to a still image with a smaller display size than the predetermined display size at a fixed position while a second operation different from the first operation is being continuously received, wherein the reduced image is superimposed over the still image; and
- a switching device that selects either said frame feed reproduction device or said high-speed frame feed reproduction device to switch between said frame feed reproduction device and said high-speed frame feed reproduction device, wherein
- said frame feed reproduction device displays a still image each time an individual external frame feed operation is received when the external frame feed operation are received at a specific operating unit over intervals exceeding a specific length of time; and
- said switching device switches to said high-speed frame feed reproduction device if the external frame feed operation is continuously received or the external frame feed operations are repeatedly received over intervals shorter than the specific length of time at said operating unit while said frame feed reproduction device is selected.

16. An electronic camera according to claim 15, wherein:
said high-speed frame feed reproduction device displays a reduced image superimposed on a still image that has been displayed by said frame feed reproduction device before a switching operation is performed by said switching device.

17. An electronic camera according to claim 15, wherein:
said high-speed frame feed reproduction device sequentially displays a reduced image without switching a display of a still image.

18. An image reproduction apparatus that reads out data from a recording device that records a still image and image information corresponding to the still image having a data volume smaller than a data volume of the still image into a recording medium and reproduces the still image, comprising:
- a frame feed reproduction device that sequentially switches a display of a still image recorded in the recording medium in advance;
- a high-speed frame feed reproduction device that sequentially displays a set of image information corresponding to a still image recorded in the recording medium in advance; and
- a switching device that selects either said frame feed reproduction device or said high-speed frame feed reproduction device to switch between said frame feed reproduction device and said high-speed frame feed reproduction device, wherein
- said frame feed reproduction device displays a still image each time an individual external frame feed operation is received when the external frame feed operation are received at a specific operating unit over intervals exceeding a specific length of time;
- said switching device switches to said high-speed frame feed reproduction device if the external frame feed operation is continuously received or the external frame feed operations are repeatedly received over intervals shorter than the specific length of time at said operating unit while said frame feed reproduction device is selected; and
- when said switching device has performed a first switching operation to switch to said high-speed frame feed reproduction device from said frame feed reproduction device, said high-speed frame feed reproduction device sequentially displays a set of image information corresponding to a still image recorded in the recording medium in advance while continuing to display at least a part of a still image displayed by said frame feed reproduction device immediately before the first switching operation.

19. A non-transitory computer readable recording medium having encoded thereon a computer image reproduction program comprising a set of instructions when executed by a computer to implement a method for reproducing a still image, the instructions comprising:
- a frame feed reproduction instruction for sequentially switching a display of a still image recorded in the recording medium in advance;
- a high-speed frame feed reproduction instruction for sequentially displaying a set of image information corresponding to a still image recorded in the recording medium in advance; and
- a switching instruction for switching between said frame feed reproduction instruction and said high-speed frame feed reproduction instruction by selecting either said frame feed reproduction instruction or said high-speed frame feed reproduction instruction, wherein
- said frame feed reproduction instruction displays a still image each time an individual external frame feed operation is received when the external frame feed operation are received at a specific operating unit over intervals exceeding a specific length of time;
- said switching instruction switches to said high-speed frame feed reproduction introduction if the external frame feed operation is continuously received or the external frame feed operations are repeatedly received over intervals shorter than the specific length of time at said operating unit while said frame feed reproduction instruction is selected; and
- when said switching instruction has performed a first switching operation to switch to said high-speed frame feed reproduction instruction from said frame feed reproduction instruction, said high-speed frame feed reproduction instruction sequentially displays a set of image information while continuing to display at least a part of a still image displayed by said frame feed reproduction instruction immediately before the first switching operation.

* * * * *